United States Patent
Oetting (12) 
(10) Patent No.: US 10,246,145 B1
(45) Date of Patent: Apr. 2, 2019

(54) TIRE CARRIER

(71) Applicant: GM GLOBAL TECHNOLOGY OPERATIONS LLC, Detroit, MI (US)

(72) Inventor: Luciano L. Oetting, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 15/698,982

(22) Filed: Sep. 8, 2017

(51) Int. Cl.
  *B62D 43/04* (2006.01)
  *B62D 43/00* (2006.01)

(52) U.S. Cl.
  CPC ......... *B62D 43/045* (2013.01); *B62D 43/002* (2013.01)

(58) Field of Classification Search
  CPC .......................... B62D 43/045; B62D 43/002
  USPC ................................................. 414/462–466
  See application file for complete search history.

(56) References Cited

U.S. PATENT DOCUMENTS

| | | | | |
|---|---|---|---|---|
| 1,983,767 A * | 12/1934 | Mueller | ............... | B62D 43/045 224/42.2 |
| 4,072,258 A * | 2/1978 | Cruson | ............... | B62D 43/002 224/42.21 |
| 4,221,312 A * | 9/1980 | Wertjes | ................. | B62D 43/04 224/42.21 |
| 4,278,191 A * | 7/1981 | Mecham | ............... | B62D 43/002 224/42.21 |
| 5,480,201 A * | 1/1996 | Mercer | .................... | B66C 1/30 294/111 |
| 5,803,324 A * | 9/1998 | Silberman | ............... | B62D 43/04 224/42.23 |
| 5,860,786 A * | 1/1999 | Aubrecht | ............. | B62D 43/002 224/42.21 |
| 6,409,454 B1 * | 6/2002 | Yamamoto | ........... | B62D 43/045 254/323 |

FOREIGN PATENT DOCUMENTS

DE  4040950  * 12/1990

* cited by examiner

*Primary Examiner* — Lynn E Schwenning (57) ABSTRACT

A tire carrier assembly includes a tire carrier, a carrier support assembly which is lockable and unlockable and configured to support the tire carrier in a stowed position when locked and to lower the tire carrier toward a deployed position when unlocked, and a hoist coupled to the carrier support assembly. The hoist is configured to lock the carrier support assembly and to be selectively actuatable to unlock the carrier support assembly.

15 Claims, 5 Drawing Sheets

TIRE CARRIER

The present invention relates generally to the field of vehicles and, more specifically, to a double cable hoist tire carrier.

Most vehicles today carry a spare tire in case one of the regular tires is damaged and becomes flat. This spare tire is normally secured within a trunk or another part of the vehicle where it would not be expected to interfere with vehicle performance or passenger comfort or safety. For example, many spare tires for automobiles are carried below a rear portion of the vehicle chassis underneath the trunk. In such cases, the spare tires are accessed by an operator of the vehicle through an actuation of a spare tire lowering assembly through a base of the trunk in order to lower the spare tire from the stowed position toward a deployed position and a subsequent removal of the spare tire by the operator from its support.

The process noted above can prove difficult for an operator where the spare tire is heavy and not easily removed from its support. Moreover, in certain current and future vehicles, regulations may be or have already been promulgated which stipulate that a fuel tank be installed in or around a location where spare tires are normally stowed and may result in a redesign of the spare tire lowering assembly or the support. In particular, certain European standards for emissions require that a fuel tank, such as a diesel exhaust fluid (DEF) tank, be disposed in or around a spare tire location due to a lack of free space around other portions of the chassis and current hoist systems do not provide for usable volume inside the spare tire volume.

SUMMARY

Embodiments according to the present disclosure provide a number of advantages. For example, embodiments according to the present disclosure improve the ease of access to a spare tire stored on a vehicle and, in some embodiments, utilize the volume inside the spare tire for storage.

In one aspect, a tire carrier assembly includes a tire carrier, a carrier support assembly which is lockable and unlockable and configured to support the tire carrier in a stowed position when locked and to lower the tire carrier toward a deployed position when unlocked, and a hoist coupled to the carrier support assembly. The hoist is configured to lock the carrier support assembly and to be selectively actuatable to unlock the carrier support assembly.

In some aspects, the carrier support assembly is attachable to a vehicle chassis.

In some aspects, the tire carrier includes a tire-shaped webbing.

In some aspects, the tire carrier includes a first tire carrier end and a second tire carrier end defining a tire-sized aperture.

In some aspects, the stowed position is proximate to an underside of the vehicle chassis and the deployed position is distant from the underside of the vehicle chassis.

In some aspects, the carrier support assembly substantially maintains an orientation of the tire carrier relative to the vehicle chassis during a vertical translation of the tire carrier toward the deployed position.

In some aspects, the carrier support assembly includes a first cable, a second cable, a first cable guide member, and a second cable guide member, wherein the first cable passes through the first cable guide member from the hoist to the first tire carrier end and the second cable passes through the second cable guide member from the hoist to the second tire carrier end.

In some aspects, the hoist includes a first cable reel and a second cable reel, the hoist being selectively actuatable to either concurrently release the first and second cables to lower the tire carrier to the deployed position or concurrently wind the first and second cables to raise and lock the tire carrier in the stowed position.

In another aspect, a tire carrier assembly for a vehicle chassis includes a tire carrier coupled to the vehicle chassis and configured to support a tire, a carrier support assembly which is lockable and unlockable and configured to support the tire carrier in a stowed position with the tire proximate to the vehicle chassis when locked and to lower the tire carrier toward a deployed position with the tire distant from the vehicle chassis when unlocked, and a hoist coupled to the vehicle chassis and to the carrier support assembly. The hoist is configured to lock the carrier support assembly and to be selectively actuatable to unlock the carrier support assembly.

In some aspects, wherein the tire carrier includes webbing shaped to accommodate the tire.

In some aspects, the tire carrier includes a first tire carrier end and a second tire carrier end defining a tire-sized aperture.

In some aspects, the carrier support assembly substantially maintains an orientation of the tire carrier relative to the vehicle chassis during a vertical translation of the tire carrier toward the deployed position.

In some aspects, the carrier support assembly includes a first cable, a second cable, a first cable guide member, and a second cable guide member. The first cable passes through the first cable guide member from the hoist to the first tire carrier end and the second cable passes through the second cable guide member from the hoist to the second tire carrier end.

In some aspects, the tire carrier assembly further includes a tank securely disposable within a volume of the tire when the tire carrier is in the stowed position with the tire proximate to the chassis.

In some aspects, the hoist includes a first cable reel and a second cable reel, the hoist being selectively actuatable to either concurrently release the first and second cables to lower the tire carrier to the deployed position or concurrently wind the first and second cables to raise and lock the tire carrier in the stowed position.

In yet another aspect, an automotive vehicle includes a chassis, a tire carrier configured to support a tire, a carrier support assembly which is lockable to and unlockable from the chassis and configured to support the tire carrier in a stowed position with the tire proximate to the chassis when locked and to lower the tire carrier toward a deployed position with the tire distant from the chassis when unlocked, and a hoist assembly coupled to the chassis and to the carrier support assembly. The hoist is configured to lock the carrier support assembly in the stowed position and to be selectively actuatable to unlock the carrier support assembly from the deployed position.

In some aspects, the tire carrier includes a first tire carrier end and a second tire carrier end defining a tire-sized aperture, and the carrier support assembly substantially maintains an orientation of the tire carrier relative to the chassis during the vertical translation of the tire carrier toward the deployed position.

In some aspects, the automotive vehicle further includes a tank securely disposable within a volume of the tire when the tire carrier is in the stowed position with the tire proximate to the chassis.

In some aspects, the carrier support assembly includes a first cable, a second cable, a first cable guide member, and a second cable guide member. The first cable passes through the first cable guide member from the hoist to the first tire carrier end and the second cable passes through the second cable guide member from the hoist to the second tire carrier end. The hoist includes a first cable reel and a second cable reel and the hoist is selectively actuatable to wind or unwind the first and second cable reels to either concurrently unwind the first and second cables to lower the tire carrier to the deployed position or concurrently wind the first and second cables to raise and lock the tire carrier in the stowed position.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
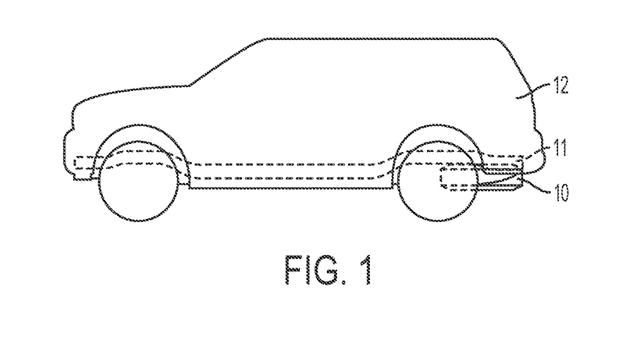
FIG. 1 is a schematic side view of a vehicle, according to an embodiment.
Figure 2:
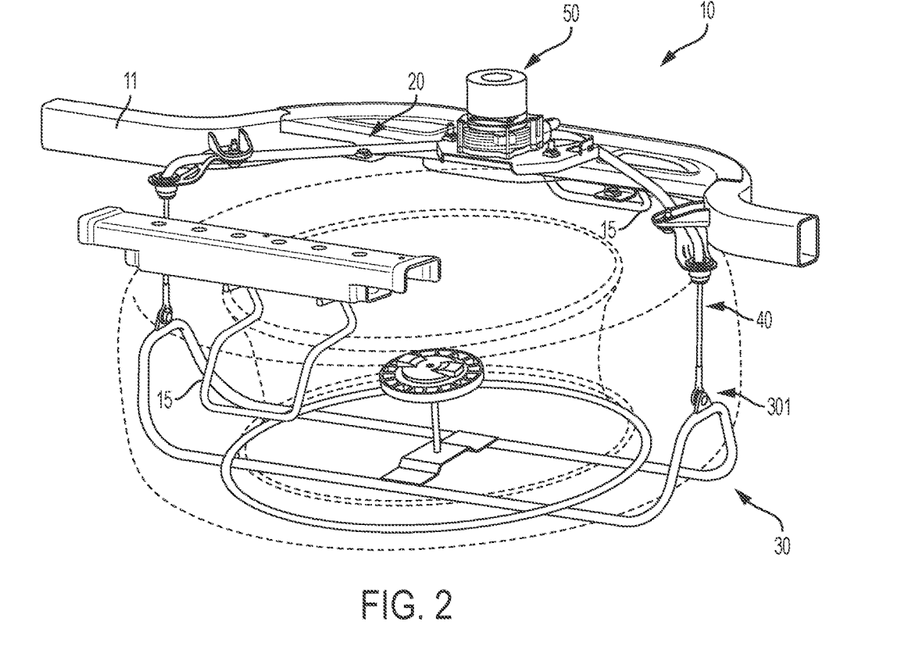
FIG. 2 is a perspective view of a tire carrier assembly of a vehicle, according to an embodiment.

With reference to FIGS. 1 and 2, in accordance with exemplary embodiments, a tire carrier assembly 10 is provided for use with a chassis 11 of a vehicle 12. The vehicle 12 may be any vehicle that moves along the ground on tires and thus needs to have at least one or more spare tire at any given time in case of an accident or damage to one of the regular tires. In an exemplary case, the vehicle 12 may be a passenger car or a truck but it is to be understood that the following description is not limited to any one particular arrangement or vehicle type. In any case, the tire carrier assembly 10 provides for an under-vehicle, spare tire carrier that allows for the usage of a volume of space within the spare tire, keeps the spare tire always parallel or substantially parallel to the ground, and requires a relatively small removal space.

As shown in FIG. 2 and with additional reference to FIGS. 3-8, the tire carrier assembly 10 includes an assembly bracket 20 that is attachable to the chassis 11 by any suitable attachment or fastening feature, a tire carrier 30 that is configured to support or contain therein a tire 301, such as a spare tire for the vehicle 12 of FIG. 1, a tire carrier support assembly 40, and a hoist assembly 50. The tire carrier support assembly 40 is lockable to a stowed position and unlockable to a deployed position by the hoist assembly 50 as will be described herein.

The tire carrier support assembly 40 is configured to support the tire carrier 30 in a stowed position and lower the tire carrier 30 to an unstowed or deployed position when the hoist assembly 50 is activated. The stowed position is characterized in that the tire carrier 30 and the tire 301 that is supported or contained therein is/are disposed proximate to respective undersides of the chassis 11 and the assembly bracket 20 (see FIGS. 2 and 6). The deployed position is characterized in that the tire carrier 30 and the tire 301 supported or contained therein is/are disposed at a distance from the respective undersides of the chassis 11 and the assembly bracket 20.

The hoist assembly 50 is coupled to the at least one of the chassis 11 and the assembly bracket 20 and to the tire carrier support assembly 40. The hoist assembly 50 is also configured to be selectively actuatable by, for example an operator of the vehicle 12 to selectively raise and lower the tire carrier 30 and the tire 301. At least one tire guide member 15 is coupled to the chassis 11 to hold the tire 301 in the stowed position. With reference to FIG. 2, two tire guide members 15 are shown. In some embodiments, the tire guide members 15 are positioned on opposite sides of the tire 301 to help support and restrain the tire 301 in the stowed position.

Figure 3:
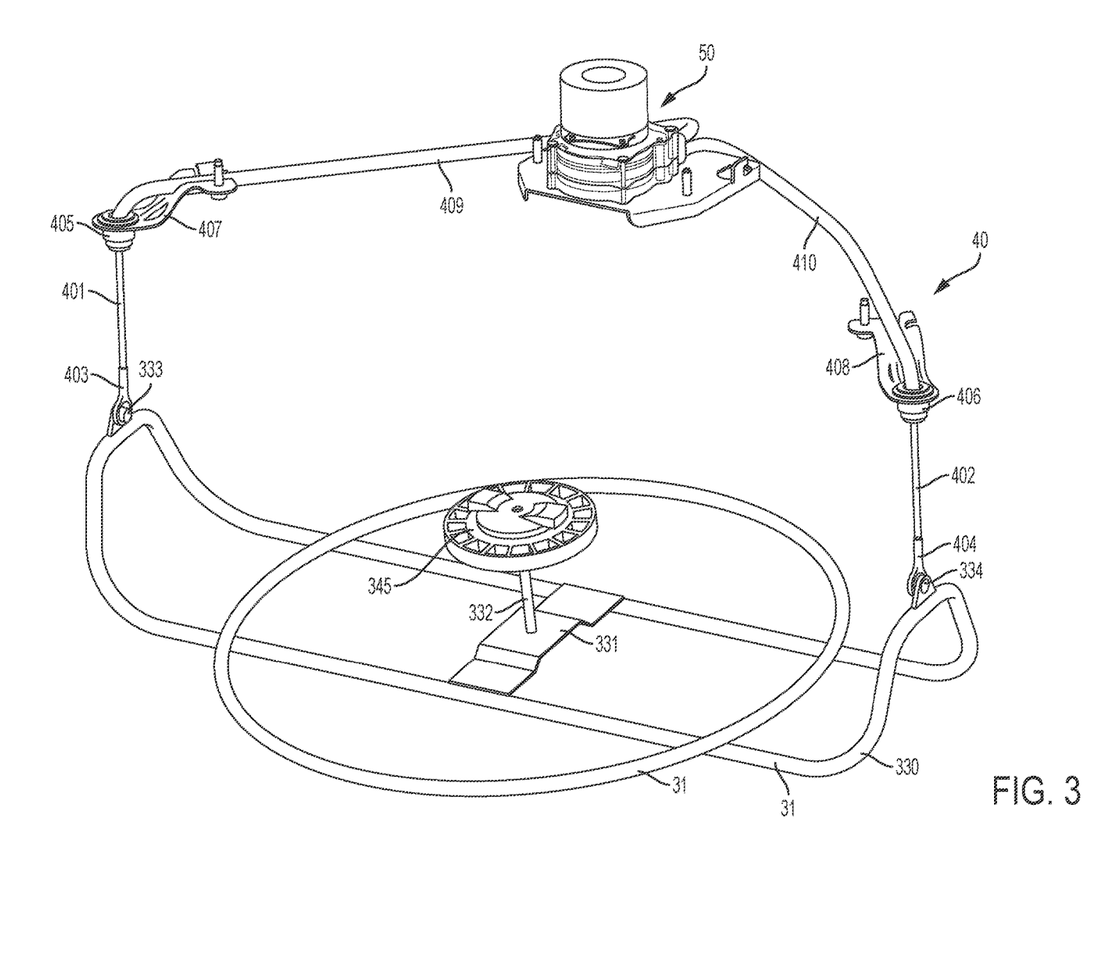
FIG. 3 is a perspective view of a tire carrier of the tire carrier assembly of FIG. 2, according to an embodiment.
Figure 4:
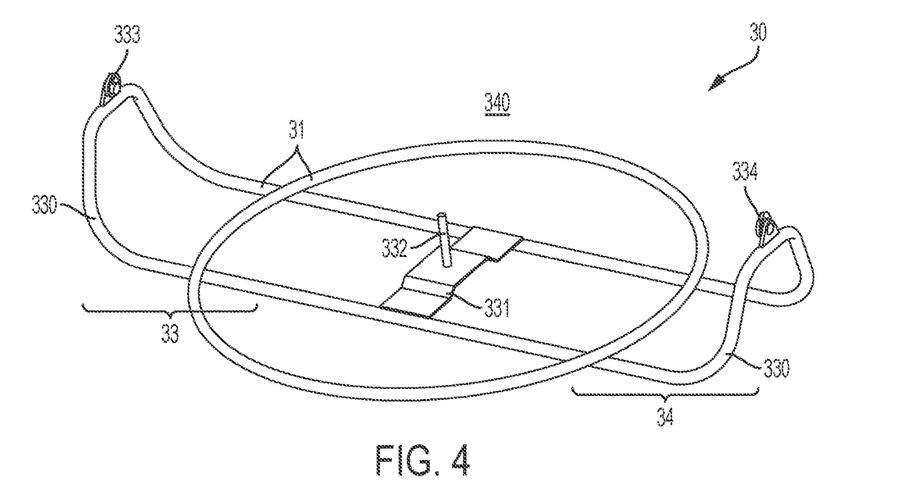
FIG. 4 is a perspective view of a tire carrier of the tire carrier assembly of FIG. 2, according to an embodiment.
Figure 5:
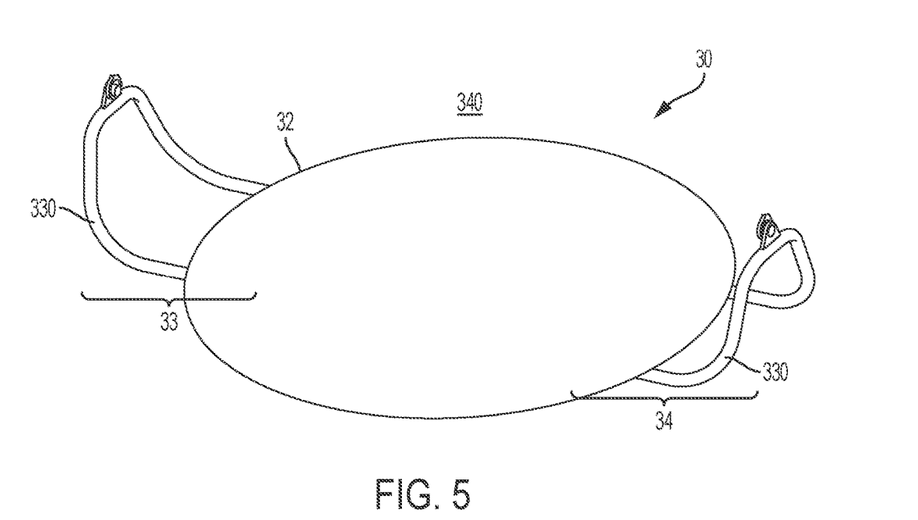
FIG. 5 is a perspective view of a tire carrier of the tire carrier assembly of FIG. 2, according to an embodiment.

With reference to FIGS. 3-5, the tire carrier 30 may be provided with multiple configurations and structures. For example, as shown in FIG. 4, the tire carrier 30 may include webbing 31 that is shaped to accommodate the tire. Such webbing 31 may include one or more sets of cross-bars that crisscross with one another to form a support for the tire. A support member 331 may be used to connect one or more sets of cross-bars of the webbing 31. In some embodiments, a post 332 and a spare tire attachment 345 extend vertically from the support member 331 to align and attach the spare tire to the tire carrier 30. As another example, as shown in FIG. 5, the tire carrier 30 may include a plate 32 that is shaped to accommodate the tire.

Figure 6:
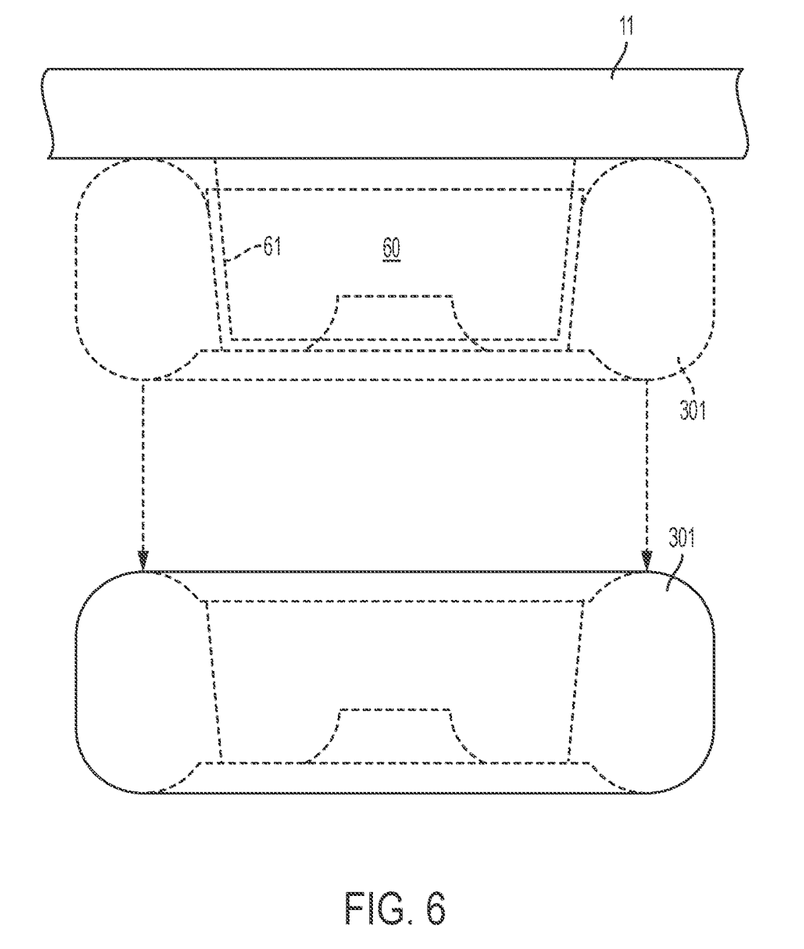
FIG. 6 is an enlarged side view of a movement of a tire about a tank, according to an embodiment.

With continued reference to FIGS. 4 and 5 and with reference back to FIGS. 2 and 3, the tire carrier 30 may have a first tire carrier end 33 and a second tire carrier end 34. The first tire carrier end 33 includes a first cable attachment point 333 and similarly, the second tire carrier end 34 includes a second cable attachment point 334. Thus, as the tire carrier 30 is lowered toward the deployed position as shown in FIG. 6, the first and second tire carrier ends 33, 34 are lowered at the same rate, maintaining the horizontal position of the tire 301. With this frame of reference, at least the first tire carrier end 33 of the tire carrier 30 and the second tire carrier end 34 are formed to define a tire-sized aperture 340. As shown in FIGS. 4 and 5, the tire constraint features 330 may be formed as upward turned wings of the webbing 31 or the plate 32 such that the tire can be secured in place whereas the tire-sized aperture 340 may be provided as an absence of such features such that, when the tire carrier 30 is lowered toward the deployed position, the tire can be ejected from the tire carrier 30 through the tire-sized aperture 340 or at least be relatively easily withdrawn.

With reference to FIG. 6 and with reference back to FIGS. 3-5, the tire carrier support assembly 40 is configured to maintain or at least substantially maintain an orientation of the tire carrier 30 relative to the chassis 11 as the tire carrier 30 is lowered toward the deployed position (see FIGS. 3-5). That is, where the vehicle 12 is disposed on level ground, the tire carrier support assembly 40 will maintain or substantially maintain the tire carrier 30 in a substantially horizontal orientation as the tire carrier 30 is lowered from the stowed position to the deployed position. As a result, as shown in FIG. 6, since the tire carrier 30 does not tilt to one side or another at any point as the tire carrier 30 is lowered, a volume of space 60 that is defined within the central portion of the tire when the tire carrier 30 is in the stowed position and supports or contains the tire therein, is not entered into by interior sidewalls of the tire during any portion of the transition from the stowed position to the deployed position.

As shown in FIGS. 3-5 and FIG. 6, since the tire carrier 30 does not tilt substantially to one side or another at any point as the tire carrier 30 is lowered or raised and since the volume of space 60 is thus not invaded by interior sidewalls of the tire, the tire carrier assembly 10 or the vehicle 12 may include a tank 61 that is securely disposable within the volume of the space 60. The tank 61 may be provided, for example, as a diesel exhaust fluid (DEF) tank for purposes of meeting with or complying with local emissions regulations. In accordance with further embodiments, a jack and tools for changing tires may be provided in the space 60 in addition to or as an alternative to the tank 61.

With reference back to FIGS. 2-5, the tire carrier support assembly 40 achieves the orientation maintenance by way of a structural assembly thereof. The tire carrier support assembly 40 includes a first cable 401 and a second cable 402. Each of the first cable 401 and the second cable 402 has a first end connected to the hoist assembly 50 and a second end attached to the tire carrier 30. As shown in FIG. 3, the second end of the first cable 401 is coupled to the first cable attachment point 333 by any mechanical attachment means, such as a first attachment loop 403. In some embodiments, the first cable attachment point 333 includes a pin such that the first attachment loop 403 encircles the pin to connect the first cable 401 to the first cable attachment point 333. Similarly, the second end of the second cable 402 is coupled to the second cable attachment point 334 by any mechanical attachment means, such as, for example and as shown in FIG. 3, a second attachment loop 404. In some embodiments, the second cable attachment point 334 includes a pin such that the second attachment loop 404 encircles the pin to connect the second cable 402 to the second cable attachment point 334.

The first cable 401 travels through a first cable guide member 409 from the hoist assembly 50. In some embodiments, the first cable guide member 409 is a rigid or semi-rigid tube that encircles the first cable 401 as it passes from the hoist assembly 50 to a first cable support member 407. In some embodiments, the first cable support member 407 is a bracket connected to the chassis 11 or the assembly bracket 20. The first cable support member 407 supports and aligns the first cable guide member 409 and secures the first cable guide member 409 to the chassis 11 so that, after exiting the first cable guide member 409, the first cable 401 is substantially vertical when connected to the first cable attachment point 333. In some embodiments, a first cable protection member 405 fits within an opening in the first cable support member 407 and encircles one end of the first cable guide member 409. The first cable protection member 405 encircles and protects the first cable 401 from abrasion or damage as the first cable 401 transitions from the first cable guide member 409.

Similarly, the second cable 404 travels through a second cable guide member 410 from the hoist assembly 50. In some embodiments, the second cable guide member 410 is a rigid or semi-rigid tube that encircles the second cable 402 as it passes from the hoist assembly 50 to a second cable support member 408. In some embodiments, the second cable support member 408 is a bracket connected to the chassis 11 or the assembly bracket 20. The second cable support member 408 supports and aligns the second cable guide member 410 and secures the second cable guide member 410 to the chassis 11 so that, after exiting the second cable guide member 410, the second cable 402 is substantially vertical when connected to the second cable attachment point 334. In some embodiments, a second cable protection member 406 fits within an opening in the second cable support member 408 and encircles one end of the second cable guide member 410. The second cable protection member 406 encircles and protects the second cable 402 from abrasion or damage as the second cable 402 transitions from the second cable guide member 410.

Figures 7, 8:
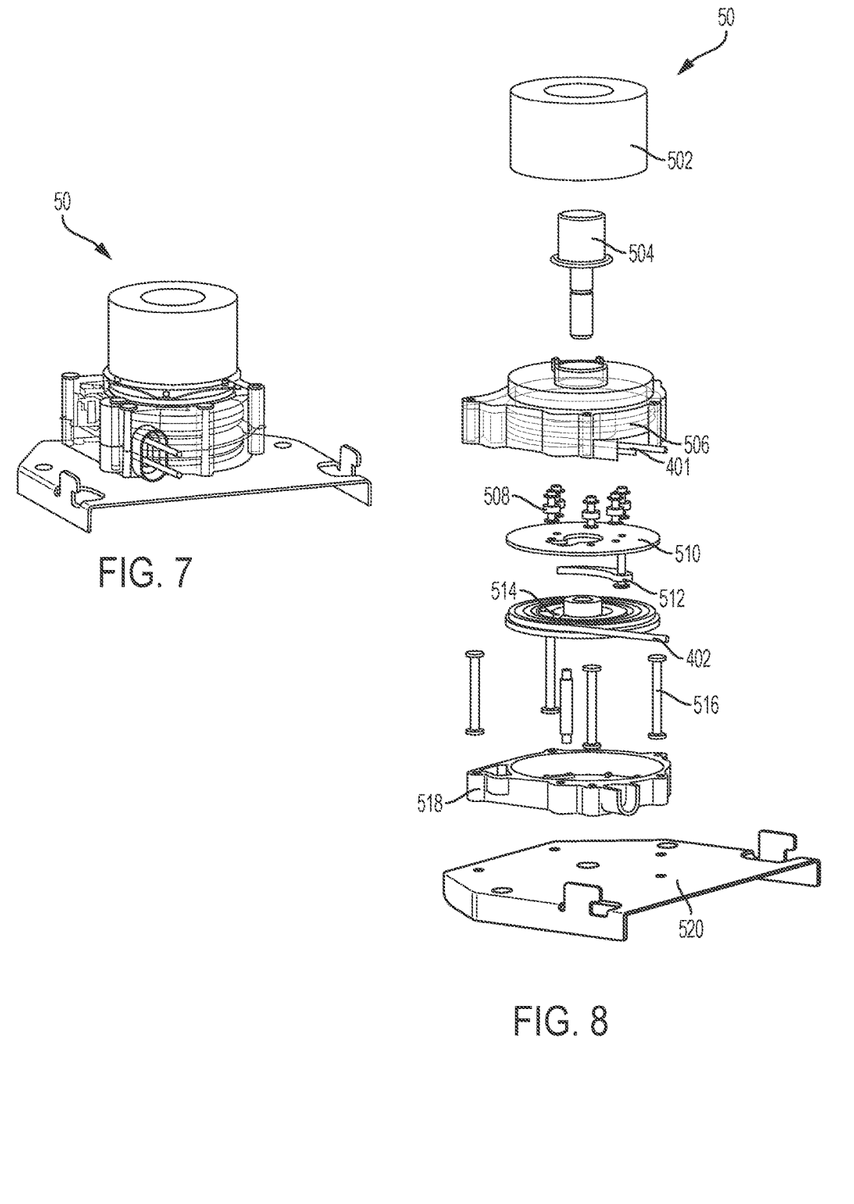
FIG. 7 is a perspective view of a double cable hoist for use with the tire carrier assembly of FIGS. 2 and 3, according to an embodiment.
FIG. 8 is a perspective exploded view of the double cable hoist of FIG. 4, according to an embodiment.

As shown in FIGS. 7 and 8, the hoist assembly 50 includes two cable reels. The dual cable reels are controlled such that the first and second cables 401, 402 are lowered and raised at the same rate to maintain a stable, longitudinal position of the tire carrier 30 and/or the tire 301. The hoist assembly 50 includes a first cable reel 506 and a second cable reel 514. In some embodiments, the second cable reel 514 is mirrored with respect to the first cable reel 506 and is disposed below the first cable reel 506. A plate 510 and lock mechanism 512 separate the first and second cable reels

506, 514. The lock mechanism 512 locks and unlocks the rotation of the cable reels to spool and wind the first and second cables 401, 402 such that the same amount of cable is released and wound on each side of the tire carrier 30. A pin 504 rotates the reels 506, 514 to load and unload the cables 401, 402. A plurality of mechanical fasteners 508, 516 connect the first and second cable reels 506, 514 to a bottom housing assembly 518, 520. The lower plate 520 of the housing assembly is mechanically coupled to the chassis 11 to secure the hoist assembly 50. In some embodiments, a cover 502 encloses both of the first and second cable reels 506, 514 to prevent the ingress of dust or other contaminants that may impede operation of the cable reels.

Selective actuation of the hoist assembly 50 may be performed by an operator of the vehicle 12 through any one of various operations. In some embodiments, the hoist assembly 50 may include an electric motor that can be controlled to selectively actuate the hoist assembly 50.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A tire carrier assembly, comprising:
   a tire carrier having a first tire carrier end and a second tire carrier end defining a tire-sized aperture, the tire carrier comprising a plurality of tire constraint members formed as upturned wings;
   a carrier support assembly which is lockable and unlockable and configured to support the tire carrier in a stowed position when locked and to lower the tire carrier toward a deployed position when unlocked, the carrier support assembly comprising a first cable, a second cable, a first cable guide member, and a second cable guide member; and a hoist coupled to the carrier support assembly;

wherein the hoist is configured to lock the carrier support assembly and to be selectively actuatable to unlock the carrier support assembly; and wherein the first cable passes through the first cable guide member from the hoist to the first tire carrier end and the second cable passes through the second cable guide member from the hoist to the second tire carrier end wherein the first cable guide member is a tubular member extending from the hoist to a first cable support member and the second cable guide member is a tubular member extending from the hoist to a second cable support member.

2. The tire carrier assembly according to claim 1, wherein the carrier support assembly is attachable to a vehicle chassis.

3. The tire carrier assembly according to claim 2, wherein the stowed position is proximate to an underside of the vehicle chassis and the deployed position is distant from the underside of the vehicle chassis.

4. The tire carrier assembly according to claim 2, wherein the carrier support assembly substantially maintains an orientation of the tire carrier relative to the vehicle chassis during a vertical translation of the tire carrier toward the deployed position.

5. The tire carrier assembly according to claim 1, wherein the tire carrier comprises a tire-shaped webbing.

6. The tire carrier assembly according to claim 1, wherein the hoist comprises a first cable reel and a second cable reel, the hoist being selectively actuatable to either concurrently release the first and second cables to lower the tire carrier to the deployed position or concurrently wind the first and second cables to raise and lock the tire carrier in the stowed position.

7. A tire carrier assembly for a vehicle chassis, comprising:

a tire carrier coupled to the vehicle chassis and configured to support a tire, the tire carrier having a first tire carrier end and a second tire carrier end defining a tire-sized aperture, the tire carrier comprising a plurality of tire constraint members formed as upturned wings to encircle at least a portion of the tire;

a carrier support assembly which is lockable and unlockable and configured to support the tire carrier in a stowed position with the tire proximate to the vehicle chassis when locked and to lower the tire carrier toward a deployed position with the tire distant from the vehicle chassis when unlocked, the carrier support assembly comprising a first cable, a second cable, a first tubular cable guide member, and a second tubular cable guide member; and a hoist coupled to the vehicle chassis and to the carrier support assembly; wherein the hoist is configured to lock the carrier support assembly and to be selectively actuatable to unlock the carrier support assembly, and wherein the first cable passes through the first cable guide member from the hoist to the first tire carrier end and the second cable passes through the second cable guide member from the hoist to the second tire carrier end wherein the first cable guide member is a tubular member extending from the hoist to a first cable support member and the second cable guide member is a tubular member extending from the hoist to a second cable support member.

8. The tire carrier assembly according to claim 7, wherein the tire carrier comprises webbing shaped to accommodate the tire.

9. The tire carrier assembly according to claim 7, wherein the carrier support assembly substantially maintains an orientation of the tire carrier relative to the vehicle chassis during a vertical translation of the tire carrier toward the deployed position.

10. The tire carrier assembly according to claim 7, further comprising a tank securely disposed within a space defined by the central portion of the tire when the tire carrier is in the stowed position with the tire proximate to the chassis.

11. The tire carrier assembly according to claim 7, wherein the hoist comprises a first cable reel and a second cable reel, the hoist being selectively actuatable to either concurrently release the first and second cables to lower the tire carrier to the deployed position or concurrently wind the first and second cables to raise and lock the tire carrier in the stowed position.

12. A vehicle, comprising:

a chassis;

a tire carrier configured to support a tire, the tire carrier having a first tire carrier end and a second tire carrier end defining a tire-sized aperture, the tire carrier comprising a plurality of tire constraint members formed as upturned wings to encircle it least a portion of the tire;

a carrier support assembly which is lockable to and unlockable from the chassis and configured to support the tire carrier in a stowed position with the tire proximate to the chassis when locked and to lower the tire carrier toward a deployed position with the tire distant from the chassis when unlocked, the carrier support assembly comprising a first cable, a second cable, a first tubular cable guide member, and a second tubular cable guide member; and a hoist assembly coupled to the chassis and to the carrier support assembly; wherein the hoist is configured to lock the carrier support assembly in the stowed position and to be selectively actuatable to unlock the carrier support assembly from the deployed position, and wherein the first cable passes through the first cable guide member from the hoist to the first tire carrier end and the second cable passes through the second cable guide member from the hoist to the second tire carrier end wherein the first cable guide member is a tubular member extending from the hoist to a first cable support member and the second cable guide member is a tubular member extending from the hoist to a second cable support member.

13. The vehicle according to claim 12, wherein:

the carrier support assembly substantially maintains an orientation of the tire carrier relative to the chassis during the vertical translation of the tire carrier toward the deployed position.

14. The vehicle according to claim 13, wherein:

the hoist comprises a first cable reel and a second cable reel; and the hoist is selectively actuatable to wind or unwind the first and second cable reels to either concurrently unwind the first and second cables to lower the tire carrier to the deployed position or concurrently wind the first and second cables to raise and lock the tire carrier in the stowed position.

15. The vehicle according to claim 12, further comprising a tank securely disposed within a space defined by the central portion of the tire when the tire carrier is in the stowed position with the tire proximate to the chassis.

* * * * *